May 12, 1931. E. LUNN 1,804,837
ELECTRIC WELDING OF CAST IRON
Filed Dec. 19, 1929
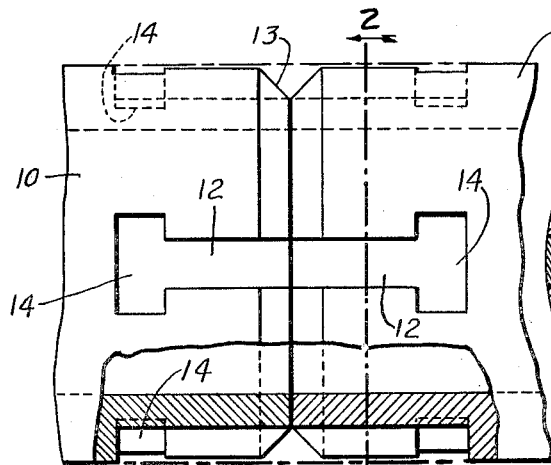
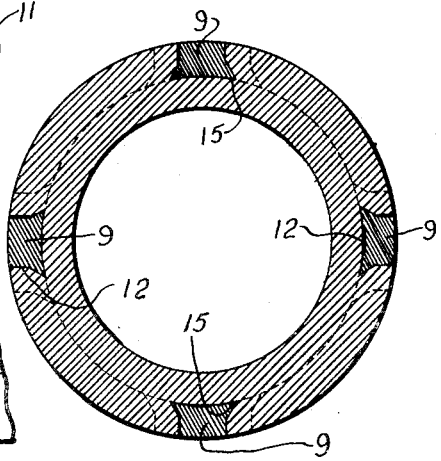
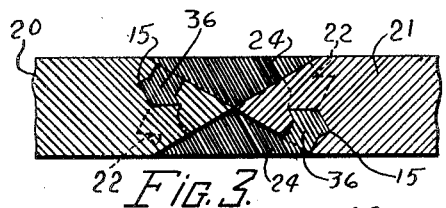
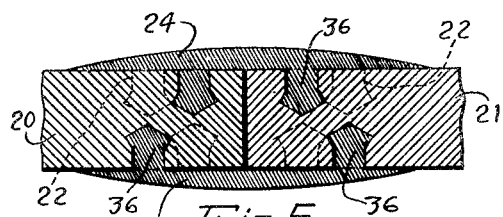
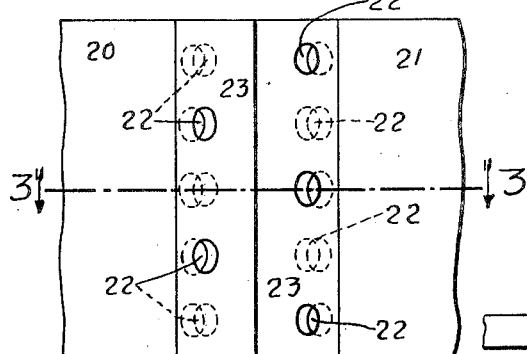
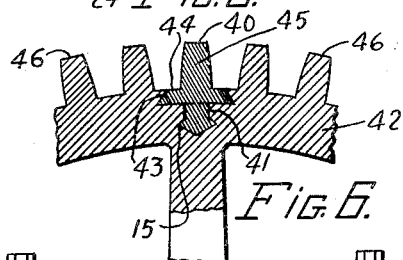
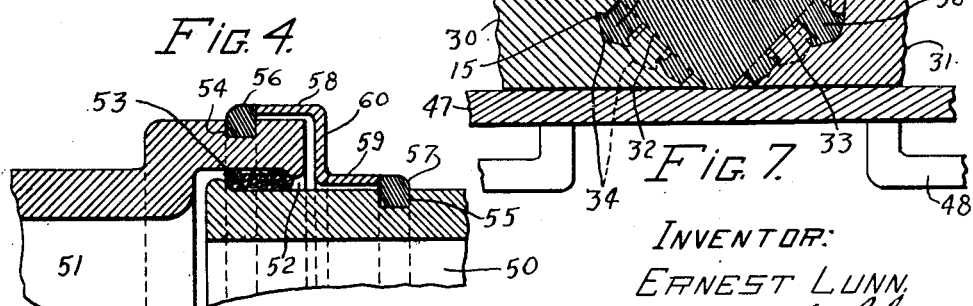
INVENTOR:
ERNEST LUNN,
by Oscar Hochberg.
his ATTORNEY Patented May 12, 1931

1,804,837

UNITED STATES PATENT OFFICE

ERNEST LUNN, OF CHICAGO, ILLINOIS, ASSIGNOR TO PULLMAN CAR AND MANUFAC-
TURING CORPORATION, OF CHICAGO, ILLINOIS, A CORPORATION OF ILLINOIS

ELECTRIC WELDING OF CAST IRON

Application filed December 19, 1929. Serial No. 415,242.

The invention relates to the art of arc welding fractured or broken cast metal parts by the deposit of liberated electrode metal distributed over the surfaces or localized areas of the parts to be joined.

It has been ascertained that steel deposited upon cast iron by the electric arc system of welding has a shrinkage force, when solidifying, greatly in excess of the tensile strength of the cast iron. When the steel has been deposited by an electric arc played directly upon the cast iron, a film of iron carbide is formed at the juncture of the two metals. This layer of iron carbide, though very hard, is extremely brittle and has no appreciable elongation value, and the deposited steel, when allowed to cool, may become separated from the cast iron.

To neutralize the strains thus induced, it was found necessary to so dispose the deposited metal that the strains imposed will be neutralized. This may be accomplished by first drilling holes in the surface of the parts to be welded at right angles to the direction of strain, filling these holes with molten steel to form anchorages, and connecting the anchorages by depositing a continuous layer of steel over the surface of the iron between the holes.

It is therefore the principal object of the invention to electrically restore broken or fractured castings to their original form or unite cast metal sections to each other by initially forming openings or depressions in contiguous areas of the castings and depositing therein a quantity of electrode steel to provide anchorages, then homogeneously uniting the anchorages by a continuous layer of metal deposited upon the intervening surface of the iron.

The foregoing and other objects are achieved by means illustrated in the accompanying drawings, in which—

Figure 1 illustrates a method of joining two sections of pipe, the view showing contiguous portions of the pipe sections broken away to better illustrate the character and disposition of the openings and depressions in the surface of the sections;

Figure 2 is a vertical section through one of the pipes taken on line 2—2, of Figure 1, showing the connecting electrode metal deposited within the openings;

Figures 3 and 4 show a method of preparing two plates to be joined end to end by arc welding in accordance with this invention when it is desired to preserve the original dimensions of the parent castings;

Figure 5 illustrates a joint for two plates edgewise by means of a pad of electrode metal distributed over the casting surfaces between and about the anchorage openings when adherence to original dimensions or contour is not important;

Figure 6 shows a gear wheel in fragmentary view in partial section to expose deposited metal full welded to the surfaces of the opening in the rim of the gear and forming the anchorage for a mass of electrode metal finished to the contour of the remaining teeth in the gear;

Figure 7 is a view similar to Figure 3 except that the edges of the plates are beveled on but one side of the plates and joined by arc welding in accordance with the invention; and Figure 8 illustrates an expansion joint of pressed steel plate for use with cast iron pipes in which annular grooves have been filled with electrode metal full welded to the grooves and built up to provide anchorages for the joint to which it has also been welded.

It is generally believed among electric arc welding operators and welding engineers that dependable arc welds cannot be made between steel and cast iron parts. The reason advanced for the supposed fact is that when the electric arc is applied to the surface of a cast iron body the temperature is raised to such a high degree that the graphitic carbon which is always present in that material is caused to combine with the iron and form iron carbide, which has a relatively low tensile strength, is brittle, and has other undesirable characteristics.

That belief gave rise to the practice of joining fractured steel or cast iron parts by drilling holes in the surfaces adjacent the joint between the parts to be welded, and tapping them, whereupon steel studs were screwed into the holes to serve as anchors for a pad of electrode metal distributed over contiguous areas and protruding ends of the studs to bind the parts together. The method was open to the objection that the heat of the deposited metal of the pad so expanded the studs that the holes were enlarged and the studs upon cooling and shrinking became loose in such holes and resulted in the failure of the weld already weakened by the drilling of the holes. It follows that, by filling such holes with molten steel at a temperature designed to effect homogeneous union with the wall metal of the holes in accordance with the method herein proposed, the original section and strength of the parts will be preserved.

In the practice of the invention, the welding operation is initiated by the use of an arc played upon the bottom and wall base of the opening to penetrate as deeply and quickly as possible into the cast iron body to at once overcome the chilling properties of the cold base metal and heat the bottom and adjacent wall areas to near the melting point of cast iron. At this stage of the operation the wall areas at the base of the opening will have become enlarged by the burning away of some of the wall metal and cavities created into which a portion of the molten metal deposited will find its way.

After the initial application of the arc and the deposit of a minimum of molten metal in the bottom of the opening, the operation is continued, but the crater of the arc is maintained at a sufficient distance from the walls of the hole to avoid raising the temperature of the wall metal above the melting point, since by this time the wall metal will have reached a temperature but slightly below the fusing point, which temperature and that of the molten metal when brought into contact with the wall metal will raise the temperature of the iron wall metal to the fusion point whereupon the metals will unite in a perfect weld.

The pad of molten steel in the bottom of the hole will obviously screen the bottom of the opening from further exposure to the excessive heat of the arc played upon the deposited metal, and all danger of raising the wall metal to a temperature above the point of fusion with the steel is eliminated by the careful manipulation of the electrode tip within the opening during the filling operation and the maintenance of the arc crater a proper distance from the walls of the hole after the initial and direct application of abnormal heat to the bottom of the hole and adjacent wall portion hereinbefore noted.

By playing the arc into a puddle of molten metal adjacent the walls of the holes instead of on the walls directly, the formation of the layer of iron carbide at the juncture of the molten steel and cast iron will be prevented. This is important when it is desired to machine the parts to be united, since the carbide is so hard that it can be machined with difficulty, if at all. In cases where the anchorage metal is to be subjected to strains in the direction of the depth of the holes, it may be advisable to hammer the first metal put into the hole during its plastic stage to cover the relatively large base area of the opening whereby the lower part of the anchorage will be made larger at the bottom than the diameter of the respective holes above the base of the anchorage.

The method lends itself to various uses as evidenced by the welding of the structures depicted in the several figures of the drawings, in which 10 and 11 represent two sections of cast iron pipe to be joined by arc welding. Upon opposite sides of the joint between the pipes and spaced apart about the pipe periphery are elongated openings 12 with enlarged terminal head portions 14 designed to provide matrices for the molten steel anchorage metal 9 deposited therein according to the invention. The anchorage will displace the iron removed from the pipe surface and assume the form of such openings.

The joint 13 between the two pipes, hollowed out by the beveling of the meeting pipe edges, will provide a further repository for metal forming a reinforcing band uniting with and traversing the metal strips in openings 12 and together forming a connecting spider of cast steel, combining ruggedness with great strength and permanency. Elongated openings 12 with enlarged head portions 14 of the form indicated will mold the deposited steel into strips having a T-bolt contour providing shackles of high gripping capacity designed to enter into homogeneous union with the metal defining such openings and rigidly connect and reinforce the pipe sections.

As previously explained, the openings at their base are enlarged by the burning away of some of the adjoining wall metal to provide cavities 15 to receive molten steel during the filling operating as shown in Figure 2. Any force tending to disrupt the joint would be resisted longitudinally by strip and head portions 12 and 14 and laterally by the annular band of metal (not shown) deposited in joint groove 13 shown in Figure 1.

The principle of the invention is further exemplified in the welding of two cast iron plates 20 and 21 chamfered as shown in Figures 3 and 4 to avoid deposits of metal outside of their respective overall dimensions. In this instance the anchorage opening are in the form of cylindrical holes 22 drilled in the faces 23 of the chamfered ends of the plates and filled with molten steel in accordance with the described method and developed until the chamfered ends of the plates are covered by a connecting pad of metal 24 as rigid and strong as the body of the plates themselves. It has been determined that when the holes in the opposite faces of the chamfer on each plate are staggered with respect to each other and the holes in the companion plate chamfer as shown in Figure 4, the bond metal is more easily applied and the danger of weakening the effective section of the plates is minimized and the stress points of the connecting pad and plates are uniformly distributed.

When a number of parts to be welded are spaced apart or an open fissure results in a single block of cast iron, the cleft seam is filled with molten steel to insure positive abutment between the parts or sections as indicated in Figure 7.

In the embodiment shown, two parts 30 and 31 to be welded, are chamfered at their respective edges and the faces 32 and 33 drilled to provide openings 34 staggered with respect to each other as in Figures 3, 4, and 5, and connected by a pad 35 of deposited steel homogeneously united with the anchorage lug portions 36 built up in the openings 34 in accordance with the method above described. In this manner, the parts on opposite sides of the fracture or joint are joined by the weld metal which is firmly anchored into the cast iron and fully as strong in tension as the parent metal. As also shown in this figure, the work may be supported upon a bench 47 or other rest, if the work can be moved, and held down for the period of the welding operation by clamps 48.

The character of the weld will vary to some extent with the nature of the work to be done. In the case of a broken or missing gear tooth 40 of the gear wheel depicted in Figure 6, a hole 41 is drilled in the rim 42 of the wheel, should the greater part of the tooth above its base be missing, to form the contracted lower portion of recess 43 axially above it, so that after the smaller opening 41 has been filled with anchorage metal 44 in the manner previously noted, the filling operation is continued until the recess 43 has been filled up to provide a base for a tooth of the size required, and a mass of metal 45 deposited thereon sufficient in quantity to be finished to the contour of the other teeth 46 of the gear.

As shown in Figure 8, the process may be utilized in expansion joints for pipe lines in which liquid tight connections are of paramount importance. A standard cast iron pipe section 50 is nested within an adjoining bell-mouthed cast iron pipe section 51 with an annular space 52 between them for the packing band 53 to prevent the contents of the pipe line from accumulating in the joint.

In adapting the invention to this class of work, it will be necessary to provide annular grooves 54 and 55 in the outer peripheral surfaces of the pipes 51 and 50, respectively, the one groove 54 in the overlapping zone of the pipe ends at the bell-mouth and the other and relatively smaller groove 55 a suitable distance therefrom on the pipe 50. Molten steel is deposited in the grooves to form circular bands 56 and 57 connected by a flexible Z-shaped metal ring having its oppositely extending flanges 56 and 59 enclosing, tho spaced from, the pipe areas between the respective bands 56 and 57 and yieldably connected by the transversely extending ring web 60 for the purpose of allowing relative longitudinal movement of the pipe sections after the ring flanges have been welded to the bands as shown.

The process of arc welding described has demonstrated its practicability in the repair and restoration of broken hammer blocks, fly wheels and gears, engine beds, and other heavy and light castings, with definitely gratifying reduction in the cost of labor and materials. In the majority of cases no other system of welding could have been successfully used and in no case were results as satisfactory as those obtained by the newer method herein disclosed.

What I claim is:

1. The method of arc-welding cast iron which consists in forming anchorage openings in contiguous surfaces of the parts to be joined, pre-heating the bottom and wall bases of the respective openings and burning away portions of base adjacent wall metal and depositing molten metal to fill the cavities in the wall metal, and subsequently depositing additional metal to fill said openings and effect homogeneous union with the wall metal, and uniting the metal in the several openings by metal pads developed in areas between said openings.

2. The method of forming steel anchorages in cast iron which consists in forming anchorage openings in the parent metal, pre-heating the bottom and wall bases of the respective openings, burning away portions of the base adjacent wall metal to provide openings having base areas relatively larger than the normal diameter of the respective openings, and depositing a quantity of electrode steel to cover said bases at a temperature designed to effect homogeneous union with the parent metal.

In witness whereof I have hereto set my hand this 17th day of December, 1929.

ERNEST LUNN.